(12) United States Patent
Wang et al.

(10) Patent No.: US 9,588,520 B2
(45) Date of Patent: Mar. 7, 2017

(54) POSITIONING NAVIGATION METHOD AND ELECTRONIC APPARATUS THEREOF

(71) Applicants: Kinpo Electronics, Inc., New Taipei (TW); Cal-Comp Electronics & Communications Company Limited, New Taipei (TW)

(72) Inventors: Huan-Sheng Wang, New Taipei (TW); Hsin-Hua Peng, New Taipei (TW); Fang-Ru Wu, New Taipei (TW)

(73) Assignees: Kinpo Electronics, Inc., New Taipei (TW); Cal-Comp Electronics & Communications Company Limited, New Taipei (TW)

(*) Notice: Subject to any disclaimer, the term of this patent is extended or adjusted under 35 U.S.C. 154(b) by 37 days.

(21) Appl. No.: 14/848,339

(22) Filed: Sep. 9, 2015

(65) Prior Publication Data

US 2016/0370803 A1 Dec. 22, 2016

(30) Foreign Application Priority Data

Jun. 18, 2015 (TW) .............................. 104119755 A

(51) Int. Cl.
*G06F 17/10* (2006.01)
*G06G 7/78* (2006.01)
(Continued)

(52) U.S. Cl.
CPC ................................. *G05D 1/0219* (2013.01)

(58) Field of Classification Search
CPC .... G05D 1/0219; G01C 21/005; G01C 21/16; G01C 21/20; G01C 21/206; G01S 5/0252
(Continued)

(56) References Cited

U.S. PATENT DOCUMENTS

| 7,587,260 B2 | 9/2009 | Bruemmer et al. |
| 8,498,811 B2 | 7/2013 | Lundquist et al. |

(Continued)

FOREIGN PATENT DOCUMENTS

| CN | 101524260 | 9/2009 |
| CN | 103389699 | 11/2013 |

(Continued)

OTHER PUBLICATIONS

"Office Action of Taiwan Counterpart Application", issued on Jun. 1, 2016, p. 1-p. 5, in which the listed reference was cited.

*Primary Examiner* — Jaime Figueroa
(74) *Attorney, Agent, or Firm* — Jianq Chyun IP Office

(57) ABSTRACT

A positioning navigation method and an electronic apparatus thereof are provided. The positioning navigation method is adapted to the electronic apparatus for positioning an indoor environment and includes the following. A movement process is executed from a start position. In the movement process, distance detection is continuously performed by first sensors, orientation detection is continuously performed by a second sensor, and a position coordinate is recorded every first time period. When sensing that a distance between the electronic apparatus and an obstacle falls in a predetermined distance range, a direction changing process is executed. In the direction changing process, the electronic apparatus rotates by a rotation angle, and an intermediate position coordinate is recorded every second time period. After the direction changing process, a position coordinate corresponding to the direction changing process is determined, and the movement process is re-executed.

14 Claims, 9 Drawing Sheets

(51) Int. Cl.
*G08G 1/16* (2006.01)
*G05D 1/02* (2006.01)

(58) Field of Classification Search
USPC .......................................................... 701/301
See application file for complete search history.

(56) References Cited

U.S. PATENT DOCUMENTS

| | | | | |
|---|---|---|---|---|
| 8,738,036 B1* | 5/2014 | Boyle | .................... | H04W 4/023 455/456.1 |
| 9,506,761 B2* | 11/2016 | Chen | ....................... | G01C 21/16 |
| 2008/0004796 A1* | 1/2008 | Schott | .................. | G01C 21/005 701/434 |
| 2008/0180637 A1* | 7/2008 | Kjeldsen | .............. | G03B 21/006 353/11 |
| 2009/0043504 A1* | 2/2009 | Bandyopadhyay | .... | G01C 17/38 701/469 |
| 2009/0177437 A1* | 7/2009 | Roumeliotis | .......... | G01C 21/12 702/150 |
| 2009/0228201 A1* | 9/2009 | Liu | ........................ | G01C 21/20 701/533 |
| 2011/0087431 A1* | 4/2011 | Gupta | ...................... | G01S 5/02 701/408 |
| 2012/0028654 A1* | 2/2012 | Gupta | ..................... | H04W 4/04 455/456.3 |
| 2014/0018095 A1* | 1/2014 | Parvizi | .................. | H04W 4/043 455/456.1 |
| 2014/0232593 A1* | 8/2014 | Varoglu | .................. | G01S 19/48 342/357.28 |
| 2015/0271646 A1* | 9/2015 | Chang | .................... | H04W 4/04 455/457 |

FOREIGN PATENT DOCUMENTS

| | | |
|---|---|---|
| TW | 201248124 | 12/2012 |
| TW | 201327078 | 7/2013 |
| WO | 01/78951 | 10/2001 |

\* cited by examiner

POSITIONING NAVIGATION METHOD AND ELECTRONIC APPARATUS THEREOF

CROSS-REFERENCE TO RELATED APPLICATION

This application claims the priority benefit of Taiwan application serial no. 104119755, filed on Jun. 18, 2015. The entirety of the above-mentioned patent application is hereby incorporated by reference herein and made a part of this specification.

BACKGROUND OF THE INVENTION

Field of the Invention

The invention relates to a navigation method and an electronic apparatus thereof, and more particularly relates to a positioning navigation method and an electronic apparatus thereof for positioning an indoor environment.

Description of Related Art

Thanks to the progress in technology, portable miniaturized electronic apparatuses become popular in our daily life. An electronic apparatus installed with different applications (APP) may provide different functions, such as communication, entertainment, timekeeping, and navigation. The conventional navigation function can guide the user of the electronic apparatus from the departure place to the target place and is required to be accurate. Thus, the environment for which the navigation function is to be used will need to be positioned accurately first.

The indoor environment is relatively small compared to the outdoor environment and therefore requires higher positioning accuracy. Since the indoor environment usually has more corners or dead ends and is more complicated, how to accurately position the indoor environment, especially the peripheral outline of the indoor environment, is an important issue in this field.

SUMMARY OF THE INVENTION

The invention provides a positioning navigation method and an electronic apparatus thereof for recording a plurality of position coordinates through movement in an indoor environment, so as to position the indoor environment. In particular, the positioning navigation method and the electronic apparatus of the invention are capable of accurately positioning corners of the indoor environment.

An embodiment of the invention provides a positioning navigation method for an electronic apparatus for positioning an indoor environment. The electronic apparatus includes a plurality of first sensors and a second sensor. The positioning navigation method includes the following. A movement process is executed from a start position. In the movement process, distance detection is continuously performed by the first sensors, orientation detection is continuously performed by the second sensor, and a position coordinate corresponding to the electronic apparatus is recorded every first time period. When detecting that a distance between the electronic apparatus and an obstacle falls in a predetermined distance range, a direction changing process is executed. In the direction changing process, the electronic apparatus rotates by a rotation angle according to the second sensor, and an intermediate position coordinate corresponding to the electronic apparatus is recorded every second time period. After the direction changing process, a position coordinate corresponding to the direction changing process is determined among the recorded intermediate position coordinates according to a distance between each intermediate position coordinate and the obstacle, the rotation angle corresponding to each intermediate position coordinate, a distance trust weight, and an angle trust weight, and the movement process is re-executed.

Another embodiment of the invention provides an electronic apparatus for positioning an indoor environment. The electronic apparatus includes a movement component, a plurality of first sensors, a second sensor, a storage unit, and a control unit. The control unit is coupled to the movement component, the first sensors, the second sensor, and the storage unit. The control unit controls the electronic apparatus to execute a movement process from a start position. In the movement process, the first sensors continuously perform distance detection, the second sensor continuously performs orientation detection, and the storage unit records a position coordinate corresponding to the electronic apparatus every first time period. When detecting that a distance between the electronic apparatus and an obstacle falls in a predetermined distance range, the control unit controls the electronic apparatus to execute a direction changing process. In the direction changing process, the electronic apparatus rotates by a rotation angle according to the second sensor, and the storage unit records an intermediate position coordinate corresponding to the electronic apparatus every second time period. After the direction changing process, the control unit determines a position coordinate corresponding to the direction changing process among the intermediate position coordinates recorded by the storage unit according to a distance between each intermediate position coordinate and the obstacle, the rotation angle corresponding to each intermediate position coordinate, a distance trust weight, and an angle trust weight, and re-executes the movement process.

Based on the above, the positioning navigation method and the electronic apparatus disclosed in the embodiments of the invention continuously record the position coordinates by executing the movement process. When the electronic apparatus encounters an obstacle, the direction changing process is executed for the electronic apparatus to evade the obstacle, and the intermediate position coordinates recorded in the direction changing process are selected for obtaining the position coordinate corresponding to the direction changing process. With the recorded position coordinate, the positioning navigation method and the electronic apparatus accurately depict the indoor environment.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
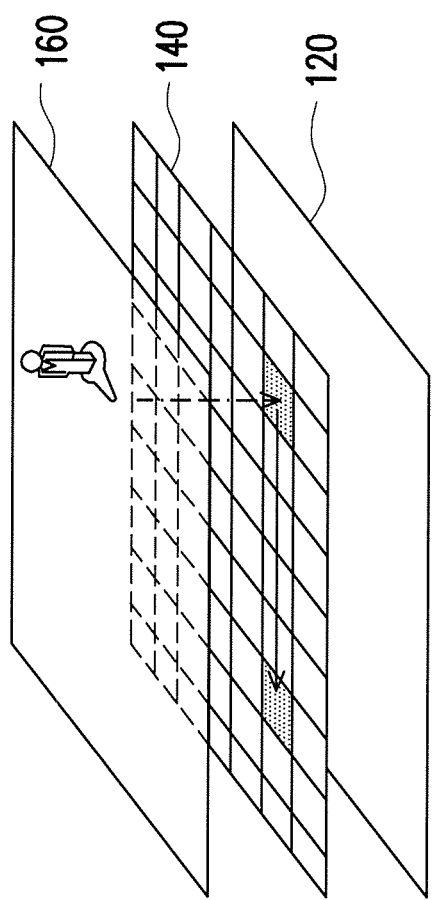
FIG. 1 is a conceptual diagram showing a navigation application according to an embodiment of the invention.

Descriptions of the disclosure are given with reference to the exemplary embodiments illustrated by the accompanying drawings. In addition, wherever possible, identical or similar reference numerals stand for identical or similar elements/components in the drawings and embodiments.

FIG. 1 is a conceptual diagram showing a navigation application (Navigation App) according to an embodiment of the invention. In this embodiment, the navigation application allows the user to remotely control a movement path of a remote device or a robot, but not limited thereto. In other embodiments, the user may use the navigation application to plan a movement path. With reference to FIG. 1, when the user activates the navigation application, the navigation application first provides the user a user interface 10. The user interface 10 includes a map layer 120, a data layer 140, and a visual auxiliary layer 160. The map layer 120 is usually a map of the environment of the user, but not limited thereto. The data layer 140 includes a coordinate system depicted based on the environment of the user and may display start point coordinates, end point coordinates, and a movement path according to an operation of the user. The visual auxiliary layer 160 is an icon representing the remote device, the robot, or the user, for example. By integrating the map layer 120, the data layer 140, and the visual auxiliary layer 160, the navigation application provides the intuitive user interface 10.

Figure 2:
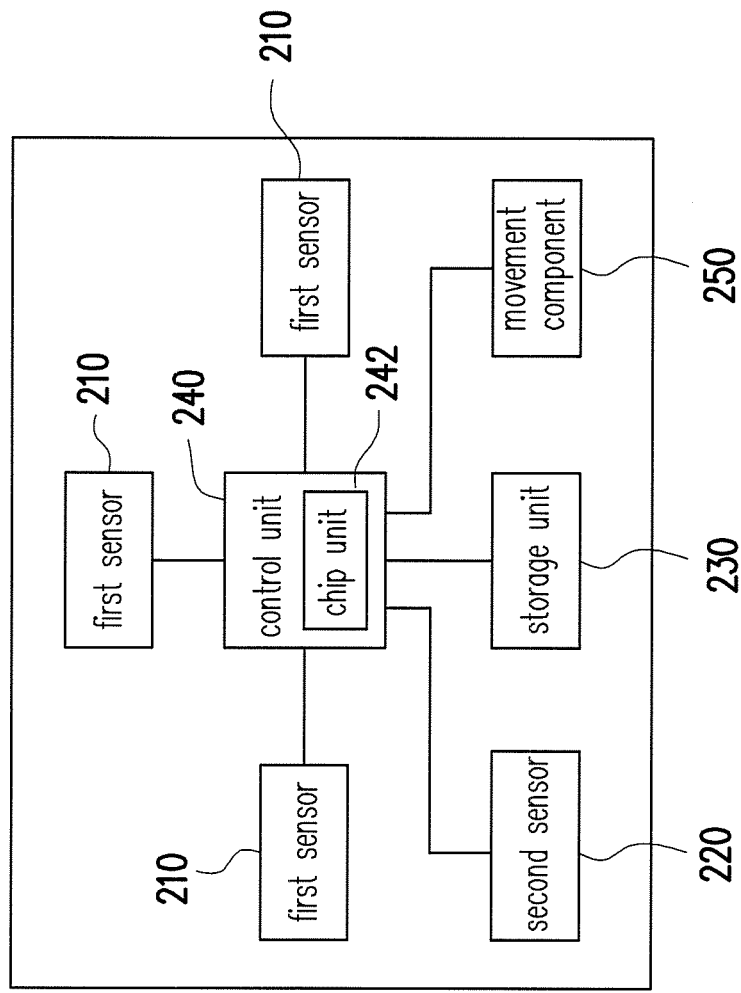
FIG. 2 is a block diagram showing the electronic apparatus according to an embodiment of the invention.

Regarding the navigation application described above, the coordinate system depicted by the data layer 140 needs to accurately match the environment displayed by the map layer 120, so as to achieve favorable navigation. Therefore, it is required to position in advance the environment for which the navigation application is to be applied. The invention provides a positioning navigation method and an electronic apparatus thereof for positioning an indoor environment. FIG. 2 is a block diagram showing the electronic apparatus according to an embodiment of the invention. With reference to FIG. 2, in this embodiment, an electronic apparatus 200 includes a plurality of first sensors 210, a second sensor 220, a storage unit 230, a control unit 240, and a movement component 250.

The first sensor 210 is an ultrasound sensor, an infrared sensor, a laser sensor, or a combination of the foregoing, for example, but not limited thereto. The first sensors 210 are disposed symmetrically or asymmetrically on the periphery of the electronic apparatus 200, for example, but not limited thereto. The first sensors 210 perform distance detection on the surroundings of the electronic apparatus 200. Take the ultrasound sensor as an example, the electronic apparatus 200 transmits and receives ultrasound for analysis, so as to determine whether there is an obstacle around the electronic apparatus 200 and estimate a distance between the electronic apparatus 200 and the obstacle.

The second sensor 220 is an electronic compass, a gyroscope, or a rotary encoder, for example, but not limited thereto. The second sensor 220 detects orientation information related to the electronic apparatus 200, especially a traveling direction of the electronic apparatus 200, and assists the electronic apparatus 200 to identify a rotation angle of the electronic apparatus 200.

The storage unit 230 is a hard disk drive (HDD) of any type, a movable random access memory (RAM), a read-only memory (ROM), a flash memory, or a combination of the foregoing, for example, but not limited thereto.

The control unit 240 is a central processing unit (CPU), a programmable microprocessor, a digital signal processor (DSP), a programmable controller, an application specific integrated circuit (ASIC), or a programmable logic device (PLD), for example, but not limited thereto. In an embodiment of the invention, the control unit 240 further includes a chip unit 242, for example. The chip unit 242 only executes an evasion process, by which the electronic apparatus 200 is prevented from getting stuck in a structural dead end of the indoor environment when positioning the indoor environment. Details of the evasion process will be provided later.

The movement component 250 is a roller, a track, or similar devices, for example. With the movement component 250, the electronic apparatus 200 is movable in the indoor environment.

Figure 3:
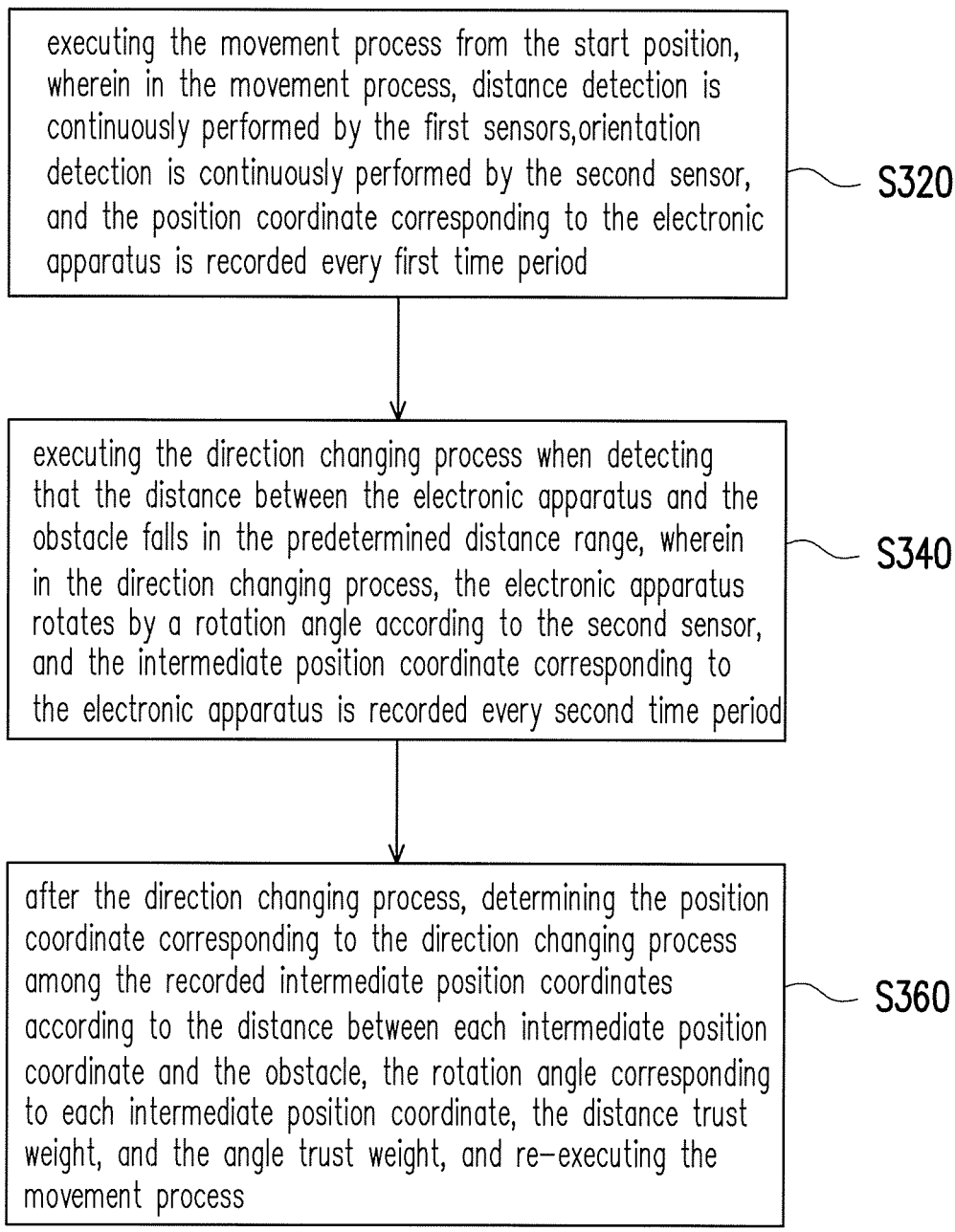
FIG. 3 is a flowchart showing the positioning navigation method according to an embodiment of the invention.

FIG. 3 is a flowchart showing a positioning navigation method according to an embodiment of the invention. With reference to FIG. 2 and FIG. 3, the positioning navigation method is adapted for the electronic apparatus 200 for positioning the indoor environment. In the positioning navigation method, the control unit 240 controls the electronic apparatus 200 to execute a movement process from a start position. In the movement process, distance detection is continuously performed by the first sensors 210, orientation detection is continuously performed by the second sensor 220, and a position coordinate corresponding to the electronic apparatus 200 is recorded in the storage unit 230 every first time period (Step S320).

Figure 4:
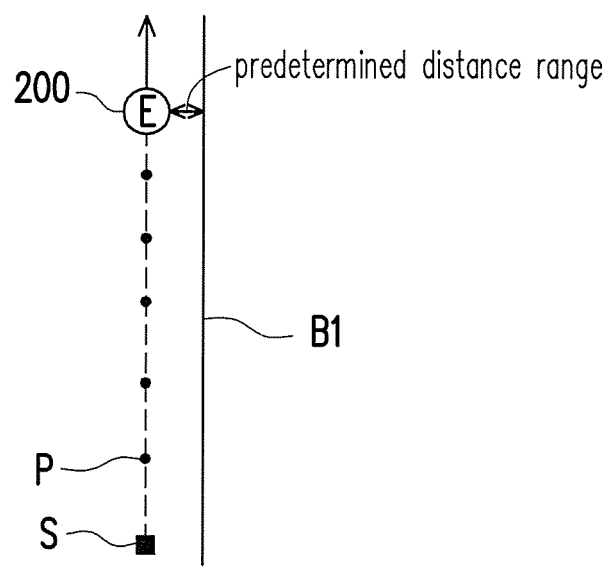
FIG. 4 is a schematic diagram showing the movement process according to an embodiment of the invention.

FIG. 4 is a schematic diagram showing the movement process according to an embodiment of the invention. Specifically, with reference to FIG. 2, FIG. 3, and FIG. 4, according to an embodiment of the invention, in the movement process, the control unit 240 controls the movement component 250 according to a predetermined distance range, such that the electronic apparatus 200 moves along a first border B1 of the indoor environment. However, it should be noted that the invention is not limited thereto. Generally, the first border B1 is a wall of the indoor environment. More specifically, in this embodiment, the control unit 240 is expected to control the electronic apparatus 200 to move along the first border B1 based on a predetermined distance. Nevertheless, in actual control, it is difficult for the electronic apparatus 200 to accurately maintain the predetermined distance with respect to the first border B1, and a certain margin is needed. Therefore, in this embodiment, the control unit 240 further obtains the predetermined distance range based on the predetermined distance. It is sufficient as long as the distance between the electronic apparatus 200 and the first border B1 falls within the predetermined distance range. For example, the predetermined distance is 5 cm and the predetermined distance range is 4.5 cm to 5.5 cm.

With the first sensors 210, the control unit 240 is able to control the electronic apparatus 200 to move along the first border B1 based on the predetermined distance range. In the movement process, the electronic apparatus 200 records a position coordinate P corresponding to the electronic apparatus 200 in the storage unit 230 every first time period starting from the start position S. The first time period is 300 ms, for example, but not limited thereto. It is known from FIG. 4 that the recorded position coordinates P depict the first border B1.

With reference to FIG. 2 and FIG. 3 again, in the movement process, when detecting that the distance between the electronic apparatus 200 and an obstacle falls in the predetermined distance range, the control unit 240 executes a direction changing process. In the direction changing process, the electronic apparatus 200 rotates by a rotation angle according to the second sensor 220, and the storage unit 230 records an intermediate position coordinate corresponding to the electronic apparatus 200 every second time period (Step S340). More specifically, when the electronic apparatus 200 moves along the first border B1, the electronic apparatus 200 changes direction when detecting an obstacle that would hinder the movement.

Figure 5A:
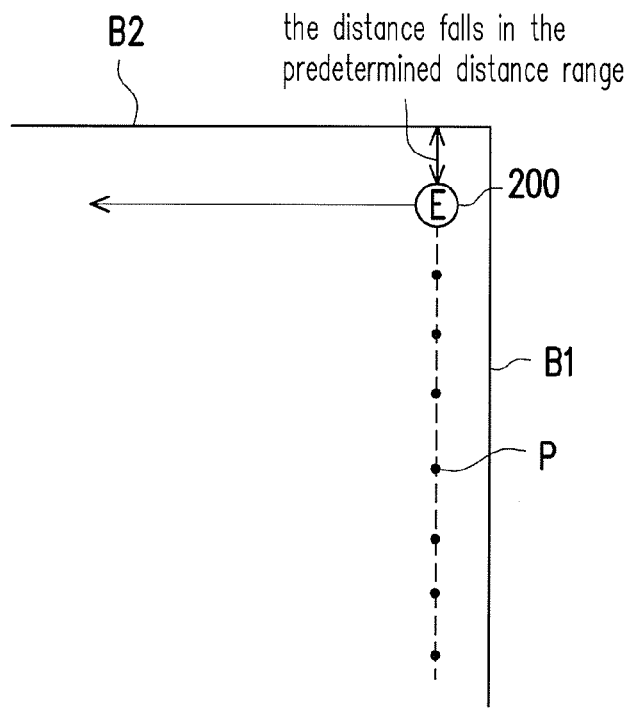
FIG. 5A is a schematic diagram showing the direction changing process according to an embodiment of the invention.

FIG. 5A is a schematic diagram showing the direction changing process according to an embodiment of the invention. As shown in FIG. 5A, the obstacle is a second border B2 of the indoor environment, for example, but not limited thereto. Generally, the second border B2 is another wall of the indoor environment. In FIG. 5A, an angle between the first border B1 and the second border B2 is 90 degrees.

With reference to FIG. 2, FIG. 3, and FIG. 5A, as the electronic apparatus 200 executes the movement process along the first border B1, the electronic apparatus 200 moves toward the second border B2. With the first sensors 210, when detecting that the distance between the second border B2 and the electronic apparatus 200 falls in the predetermined distance range (4.5 cm to 5.5 cm disclosed in the above embodiment, for example), the control unit 240 controls the electronic apparatus 200 to execute the direction changing process. It should be noted that, when detecting that the electronic apparatus 200 is too close to the obstacle and causes the distance between the electronic apparatus 200 and the obstacle to be less than the predetermined distance range, the control unit 240 controls the electronic apparatus 200 to execute a distance adjustment first, e.g. moving the electronic apparatus 200 backward. In this embodiment, when executing the direction changing process, the electronic apparatus 200 rotates by 90 degrees with help of the second sensor 220, and the control unit 240 of the electronic apparatus 200 records the intermediate position coordinate corresponding to the electronic apparatus 200 in the storage unit 230 every the second time period. The second time period is 300 ms, for example, but not limited thereto.

Figure 5B:
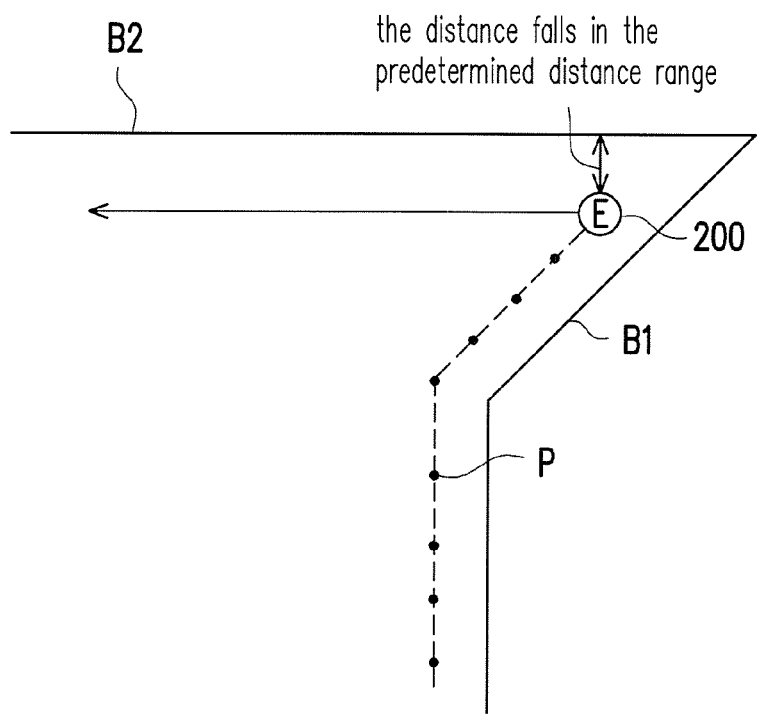
FIG. 5B is a schematic diagram showing the direction changing process according to another embodiment of the invention.
Figure 5C:
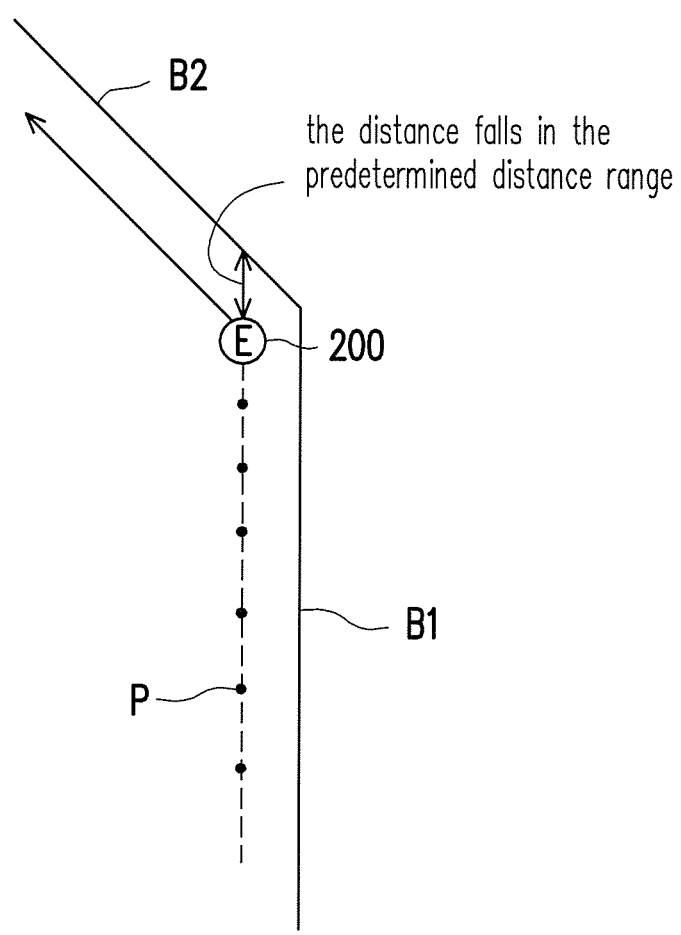
FIG. 5C is a schematic diagram showing the direction changing process according to yet another embodiment of the invention.

FIG. 5B is a schematic diagram showing the direction changing process according to another embodiment of the invention. In FIG. 5B, the angle between the first border B1 and the second border B2 is 45 degrees. Similar to the embodiment of FIG. 5A, when the electronic apparatus 200 moves along the first border B1 and, through the first sensors 210, detects that the distance between the second border B2 and the electronic apparatus 200 falls in the predetermined distance range, the control unit 240 controls the electronic apparatus 200 to execute the direction changing process and rotate by 135 degrees. FIG. 5C is a schematic diagram showing the direction changing process according to yet another embodiment of the invention. In FIG. 5C, the angle between the first border B1 and the second border B2 is 120 degrees, and the electronic apparatus 200 moves along the first border B1. When detecting that the distance between the second border B2 and the electronic apparatus 200 falls in the predetermined distance range, the control unit 240 controls the electronic apparatus 200 to execute the direction changing process and rotate by 30 degrees. However, it should be noted that the direction changing process is not only for the situations described above and may also be applied for various angles between the first border B1 and the second border B2.

With reference to FIG. 2 and FIG. 3 again, after the direction changing process is completed, the control unit 240 determines the position coordinate corresponding to the direction changing process among the intermediate position coordinates recorded in the storage unit 230 according to the distance between each intermediate position coordinate and the obstacle, the rotation angle corresponding to each intermediate position coordinate, a distance trust weight, and an angle trust weight, and re-executes the movement process (Step S360). Specifically, in the direction changing process, the electronic apparatus 200 may remain in approximately the same position. Here, the control unit 240 further selects one of the recorded intermediate position coordinates as the position coordinate P corresponding to the direction changing process.

Figure 6A:
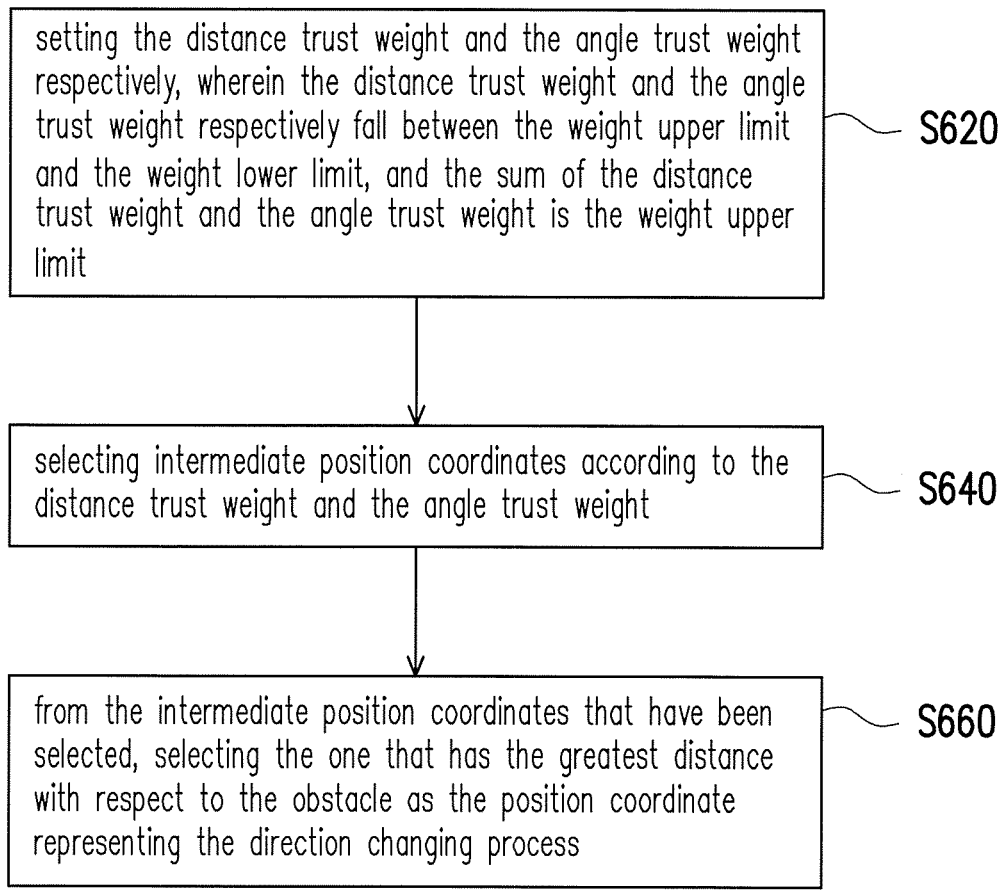
FIG. 6A is a flowchart of determining the position coordinate corresponding to the direction changing process according to an embodiment of the invention.
Figure 6B:
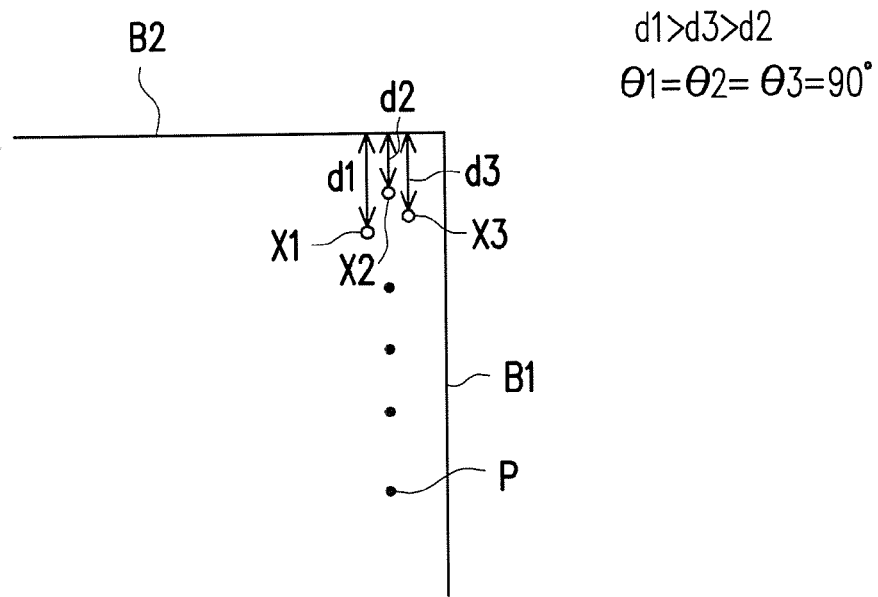
FIG. 6B is a schematic diagram showing determining the position coordinate corresponding to the direction changing process according to an embodiment of the invention.

FIG. 6A is a flowchart of determining the position coordinate corresponding to the direction changing process according to an embodiment of the invention. FIG. 6B is a schematic diagram showing determining the position coordinate corresponding to the direction changing process according to an embodiment of the invention. As shown in FIG. 6B, according to the detection result of the first sensors 210, the distances between the intermediate position coordinates X1, X2, and X3 recorded by the electronic apparatus 200 and the second border B2 (the obstacle) are d1, d2, and d3 respectively. In addition, according to the detection result of the second sensor 220, the rotation angles corresponding to the intermediate position coordinates X1, X2, and X3 are θ1, θ2, and θ3 respectively. With reference to FIG. 6A and FIG. 6B, when determining the position coordinate P representing the direction changing process, the control unit 240 first confirms and respectively sets the distance trust weight and the angle trust weight. The distance trust weight and the angle trust weight respectively fall between a weight upper limit and a weight lower limit, and a sum of the distance trust weight and the angle trust weight is the weight upper limit (Step S620). For example, the sum of the distance trust weight and the angle trust weight is 100, the distance trust weight is 75, and the angle trust weight is 25.

The distance trust weight and the angle trust weight respectively represent the error tolerances for the distances (e.g. d1, d2, and d3) and the rotation angles (e.g. θ1, θ2, and θ3). With the distance between each intermediate position coordinate and the obstacle and the rotation angle corresponding to each intermediate position coordinate as reference, the control unit 240 selects intermediate position coordinates according to the distance trust weight and the angle trust weight (Step S640), and from the intermediate position coordinates that have been selected, selects the one that has the greatest distance with respect to the obstacle as the position coordinate representing the direction changing process (Step S660). With reference to the embodiment of FIG. 6B, because the rotation angles θ1, θ2, and θ3 are all 90 degrees and the distances d1, d2, and d3 are similar, the control unit 240 retains the intermediate position coordinates X1, X2, and X3. Regarding the intermediate position coordinates X1, X2, and X3 that have been selected, since d1>d3>d2, the control unit 240 selects the intermediate position coordinate X1 as the position coordinate P corresponding to the direction changing process.

Figure 6C:
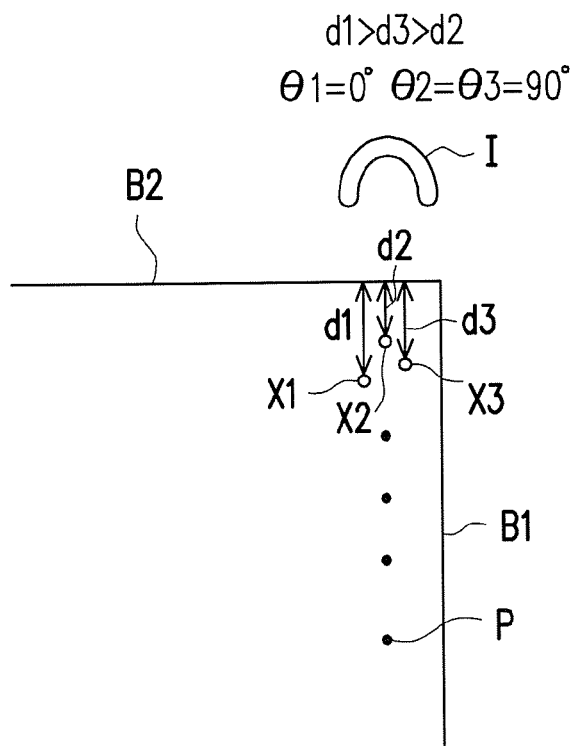
FIG. 6C is a schematic diagram showing determining the position coordinate corresponding to the direction changing process according to another embodiment of the invention.

FIG. 6C is a schematic diagram showing determining the position coordinate corresponding to the direction changing process according to another embodiment of the invention. In the embodiment of FIG. 6C, the second border B2 (the obstacle) has an interference source I that influences the detection of the second sensor 220. For example, the rotation angle θ1 corresponding to the intermediate position coordinate X1 may become 0 degree due to the influence. When performing selection of the intermediate position coordinates X1, X2, and X3, because the rotation angle θ1 is much smaller than the rotation angles θ2 and θ3, the intermediate position coordinate X1 is eliminated first. Then, because d3>d2, the control unit 240 selects the intermediate position coordinate X3 as the position coordinate P corresponding to the direction changing process.

After the position coordinate P corresponding to the direction changing process is determined, the control unit 240 re-executes the movement process. Here, the electronic apparatus 200 moves along the second border B2, for example, until the electronic apparatus 200 encounters another obstacle. Since the indoor environment is a closed environment, when the electronic apparatus 200 moves to the start position S again and the position coordinate P recorded by the storage unit 230 matches the start position S, the control unit 240 controls the electronic apparatus 200 to stop executing the movement process. At the moment, the position coordinates P recorded by the storage unit 230 are sufficient for mapping application software to further depict the indoor environment where the electronic apparatus is located.

The positioning navigation method and the electronic apparatus disclosed in the embodiments of the invention further have a function of evading a structural dead end of the indoor environment. More specifically, in the movement process, when detecting that the electronic apparatus 200 enters a structural dead end of the indoor environment, the chip unit 242 of the control unit 240 controls the electronic apparatus 200 to execute an evasion process. Similarly, in the direction changing process, when detecting that the electronic apparatus 200 is in a structural dead end of the indoor environment, the chip unit 242 controls the electronic apparatus 200 to execute the evasion process. That is, in the evasion process, the chip unit 242 of the control unit 240 controls the electronic apparatus 200 to move or rotate until the electronic apparatus 200 leaves the structural dead end.

Figure 7:
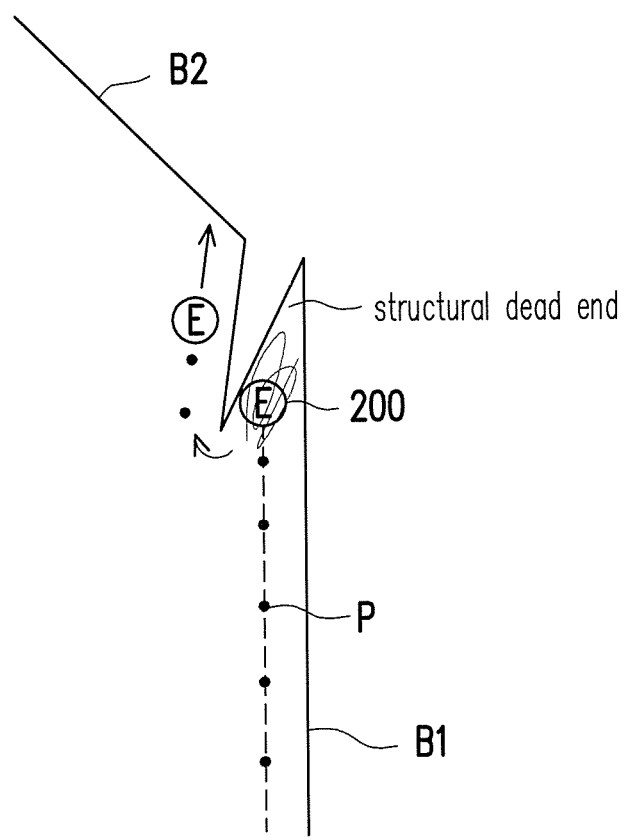
FIG. 7 is a schematic diagram showing the evasion process according to an embodiment of the invention.

FIG. 7 is a schematic diagram showing the evasion process according to an embodiment of the invention. With reference to FIG. 7, in the evasion process, the control unit 240 sets the distance trust weight to the weight upper limit (e.g. 100) and sets the angle trust weight to the weight lower limit (e.g. 0), so as to stop recording the position coordinate of the electronic apparatus 200. The chip unit 242 controls the movement component 250 of the electronic apparatus 200 to rotate and move the electronic apparatus 200 back and forth, so as to help the electronic apparatus 200 leave the structural dead end. When the first sensors 210 and the second sensor 220 detect that the electronic apparatus 200 leaves the structural dead end of the indoor environment, the chip unit 242 notifies the control unit 240 for the control unit 240 to again control the electronic apparatus 200 to execute the movement process. In an embodiment of the invention, the control unit 240 resets the distance trust weight and the angle trust weight, so as to resume recording the position coordinate of the electronic apparatus 200.

To sum up, the positioning navigation method and the electronic apparatus disclosed in the embodiments of the invention continuously record the position coordinates by executing the movement process. When the electronic apparatus encounters an obstacle, the direction changing process is executed for the electronic apparatus to evade the obstacle, and the intermediate position coordinates recorded in the direction changing process are selected for obtaining the position coordinate corresponding to the direction changing process. With the recorded position coordinate, the positioning navigation method and the electronic apparatus accurately depict the indoor environment.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A positioning navigation method for an electronic apparatus, which comprises a plurality of first sensors and a second sensor, for positioning an indoor environment, the positioning navigation method comprising:
    executing a movement process from a start position, wherein in the movement process, distance detection is continuously performed by the first sensors, orientation detection is continuously performed by the second sensor, and a position coordinate corresponding to the electronic apparatus is recorded every first time period;
    executing a direction changing process when detecting that a distance between the electronic apparatus and an obstacle falls in a predetermined distance range, wherein in the direction changing process, the electronic apparatus rotates by a rotation angle according to the second sensor and an intermediate position coordinate corresponding to the electronic apparatus is recorded every second time period; and
    determining the position coordinate corresponding to the direction changing process among the recorded intermediate position coordinates according to a distance between each of the intermediate position coordinates and the obstacle, the rotation angle corresponding to each of the intermediate position coordinates, a distance trust weight, and an angle trust weight after the direction changing process, and re-executing the movement process.

2. The positioning navigation method according to claim 1, further comprising:
    controlling the electronic apparatus to stop executing the movement process when the position coordinate recorded by the electronic apparatus matches the start position.

3. The positioning navigation method according to claim 1, wherein the electronic apparatus executes the movement process along a first border of the indoor environment and the obstacle is a second border of the indoor environment.

4. The positioning navigation method according to claim 1, wherein the movement process further comprises:
    executing an evasion process when detecting that the electronic apparatus enters a structural dead end of the indoor environment.

5. The positioning navigation method according to claim 4, wherein the direction changing process further comprises:
executing the evasion process when detecting that the electronic apparatus is in the structural dead end of the indoor environment.

6. The positioning navigation method according to claim 5, wherein the evasion process comprises:
setting the distance trust weight to a weight upper limit and setting the angle trust weight to a weight lower limit to stop recording the position coordinate of the electronic apparatus;
rotating and moving the electronic apparatus back and forth to leave the structural dead end; and
re-executing the movement process when detecting that the electronic apparatus leaves the structural dead end of the indoor environment.

7. The positioning navigation method according to claim 1, wherein the step of determining the position coordinate corresponding to the direction changing process further comprises:
setting the distance trust weight and the angle trust weight respectively, wherein the distance trust weight and the angle trust weight respectively fall between a weight upper limit and a weight lower limit, and a sum of the distance trust weight and the angle trust weight is the weight upper limit;
selecting the intermediate position coordinates according to the distance trust weight and the angle trust weight; and
selecting one of the selected intermediate position coordinates, which has the greatest distance with respect to the obstacle, as the position coordinate representing the direction changing process.

8. An electronic apparatus for positioning an indoor environment, the electronic apparatus comprising:
a movement component;
a plurality of first sensors;
a second sensor;
a storage unit; and
a control unit coupled to the movement component, the first sensors, the second sensor, and the storage unit and controlling the electronic apparatus to execute a movement process from a start position, wherein in the movement process, the first sensors continuously perform distance detection, the second sensor continuously performs orientation detection, and the storage unit records a position coordinate corresponding to the electronic apparatus every first time period,
the control unit controls the electronic apparatus to execute a direction changing process when detecting that a distance between the electronic apparatus and an obstacle falls in a predetermined distance range, wherein in the direction changing process, the electronic apparatus rotates by a rotation angle according to the second sensor and the storage unit records an intermediate position coordinate corresponding to the electronic apparatus every second time period, and
the control unit determines the position coordinate corresponding to the direction changing process among the intermediate position coordinates recorded by the storage unit according to a distance between each of the intermediate position coordinates and the obstacle, the rotation angle corresponding to each of the intermediate position coordinates, a distance trust weight, and an angle trust weight after the direction changing process, and re-executes the movement process.

9. The electronic apparatus according to claim 8, wherein the control unit controls the electronic apparatus to stop executing the movement process when the position coordinate recorded by the storage unit matches the start position.

10. The electronic apparatus according to claim 8, wherein the control unit controls the electronic apparatus to execute the movement process along a first border of the indoor environment and the obstacle is a second border of the indoor environment.

11. The electronic apparatus according to claim 8, wherein the control unit further comprises a chip unit, and
in the movement process, the chip unit controls the electronic apparatus to execute an evasion process when detecting that the electronic apparatus enters a structural dead end of the indoor environment.

12. The electronic apparatus according to claim 11, wherein in the direction changing process, the chip unit controls the electronic apparatus to execute the evasion process when detecting that the electronic apparatus is in the structural dead end of the indoor environment.

13. The electronic apparatus according to claim 12, wherein in the evasion process, the control unit sets the distance trust weight to a weight upper limit and sets the angle trust weight to a weight lower limit to stop recording the position coordinate of the electronic apparatus, and the chip unit rotates and moves the electronic apparatus back and forth to leave the structural dead end, and
the control unit controls the electronic apparatus again to execute the movement process when detecting that the electronic apparatus leaves the structural dead end of the indoor environment.

14. The electronic apparatus according to claim 8, wherein the control unit sets the distance trust weight and the angle trust weight respectively, wherein the distance trust weight and the angle trust weight respectively fall between a weight upper limit and a weight lower limit, and a sum of the distance trust weight and the angle trust weight is the weight upper limit, and
the control unit selects the intermediate position coordinates according to the distance trust weight and the angle trust weight and selects one of the selected intermediate position coordinates, which has the greatest distance with respect to the obstacle, as the position coordinate representing the direction changing process.

* * * * *